(12) United States Patent
Lee et al.

(10) Patent No.: US 7,791,693 B2
(45) Date of Patent: Sep. 7, 2010

(54) SEMI-TRANSMISSION LIQUID CRYSTAL DISPLAY DEVICE AND FABRICATING METHOD THEREOF

(75) Inventors: Jong-Hwae Lee, Seoul (KR); Sang-Ho Choi, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 149 days.

(21) Appl. No.: 11/823,916

(22) Filed: Jun. 29, 2007

(65) Prior Publication Data

US 2008/0002117 A1    Jan. 3, 2008

(30) Foreign Application Priority Data

Jun. 30, 2006    (KR)    ............... 10-2006-0061261

(51) Int. Cl.
G02F 1/1335    (2006.01)
(52) U.S. Cl. ............... 349/114; 349/96; 349/113; 349/187
(58) Field of Classification Search ............... 349/96, 349/113, 114, 187
See application file for complete search history.

(56) References Cited

U.S. PATENT DOCUMENTS

| 6,816,216 | B2* | 11/2004 | Funamoto et al. ........ 349/113 |
| 2002/0041356 | A1* | 4/2002 | Tanada et al. ............. 349/158 |
| 2003/0210484 | A1* | 11/2003 | Otake et al. ............... 359/881 |
| 2003/0231267 | A1 | 12/2003 | Murai et al. |
| 2004/0207784 | A1* | 10/2004 | Lim et al. ................... 349/114 |
| 2005/0285988 | A1* | 12/2005 | Nakagawa ................... 349/44 |
| 2006/0007087 | A1* | 1/2006 | Choi et al. ................... 345/88 |
| 2006/0050211 | A1* | 3/2006 | Kim et al. ................... 349/114 |
| 2007/0004071 | A1* | 1/2007 | Lee et al. ..................... 438/30 |
| 2007/0109453 | A1* | 5/2007 | Kaneko et al. ............... 349/38 |
| 2008/0024402 | A1* | 1/2008 | Nishikawa et al. ........... 345/82 |

OTHER PUBLICATIONS

Office Action issued in corresponding Chinese Patent Application No. 2007101260010; issued Aug. 8, 2008.

* cited by examiner

*Primary Examiner*—Ellen Kim
(74) *Attorney, Agent, or Firm*—Brinks, Hofer, Gilson & Lione

(57) ABSTRACT

A semi-transmission LCD device capable of enhancing a reflection efficiency by introducing external light to a reflection portion on an array substrate of a thin film transistor forming an overcoating layer having concave portions on a color filter substrate, and capable of enhancing a transmission efficiency of light incident from a backlight, and a fabricating method thereof. The semi-transmission LCD device comprises: a first substrate; a second substrate; black matrixes formed on the second substrate with a predetermined gap therebetween; a color filter formed between the black matrixes; a common electrode formed on the color filter; an overcoat layer, having concave portions, formed on the common electrode; and an LC layer formed between the first substrate and the second substrate.

12 Claims, 5 Drawing Sheets

SEMI-TRANSMISSION LIQUID CRYSTAL DISPLAY DEVICE AND FABRICATING METHOD THEREOF

The present invention claims the benefit of priority to Korean Application No. 2006-61261, filed on Jun. 30, 2006, which is herein expressly incorporated by reference in its entirety.

BACKGROUND OF THE INVENTION

1. Field of the Invention

The present invention relates to a semi-transmission liquid crystal display (LCD) device and a fabricating method thereof, and more particularly, to a semi-transmission LCD device capable of enhancing a reflection efficiency of light by introducing external light to a reflection portion on an array substrate of a thin film transistor by concavely forming an overcoating layer on a color filter substrate, and capable of enhancing a transmission efficiency of light incident from a backlight, and a fabricating method thereof.

2. Description of the Background Art

As information society develops in the $21^{th}$ century, a flat panel display device having a thin and light characteristic and requiring a low power consumption is being spotlighted.

The flat panel display device is divided into a light emitting display device and a light receiving display device according to its spontaneous light emitting characteristic.

The light emitting display device includes a plasma display panel device, a field emission display device, an electroluminescence display device, etc., and the light receiving display device includes a liquid crystal display (LCD) device.

The LCD device has excellent characteristics in a resolution, a color display, a picture quality, etc., thus to be actively applied to a notebook or a PC monitor.

The LCD device is an apparatus for displaying an image by attaching two substrates to each other, each substrate having an electrode for forming an electric field, by injecting a liquid crystal material between the two substrates, by moving liquid crystal molecules by an electric field generated by applying a voltage to the two electrodes, and thereby controlling a light transmittance.

However, since the LCD device is a light receiving display device that does not spontaneously emit light, an additional optical source is required.

Accordingly, the LCD device displays an image by controlling an amount of light according to arrangement of a liquid crystal, the light incident onto an LC panel from a backlight disposed at a rear surface of the LC panel.

An electrode for forming an electric field that determines arrangement of an LC is formed of a transparent conductive material, and two substrates each having the electrode are formed of transparent substrates.

The LCD device is a transmission LCD device.

Since an additional optical source such as a backlight is used, a light image can be implemented even in a dark place. However, the backlight causes power consumption to be increased.

In order to solve the problem, a reflection LCD device has been proposed.

The reflection LCD device controls a light transmittance according to arrangement of an LC by reflecting natural light or artificial light, thereby decreasing power consumption.

However, the reflection LCD device using external natural light or artificial light as an optical source can not be used in a dark place.

Accordingly, a reflection/ transmission LCD device for a reflection mode and a transmission mode has bee proposed.

A general semi-transmission LCD device will be explained in more detail.

FIG. 1 is a sectional view showing the conventional semi-transmission LCD device.

As shown, the conventional semi-transmission LCD device comprises a first substrate 10 and a second substrate 30 having a predetermined gap therebetween, and an LC layer 40 interposed between the two substrates.

A gate electrode 12 is formed on the lower first substrate 10, and a gate insulating layer 13 is formed thereon.

Before the gate insulating layer 13 is formed, a gate line (not shown) connected to the gate electrode 12 is additionally formed.

Then, an active layer 14 and ohmic contact layers 15a and 15b are sequentially formed on the gate insulating layer 13. Then, source and drain electrodes 16a and 16b are formed on the ohmic contact layers 15a and 15b.

The source and drain electrodes 16a and 16b constitute a thin film transistor (TFT) together with the gate electrode 12.

A data line (not shown) formed of the same material as the source and drain electrodes 16a and 16b is further formed on the gate insulating layer 13.

The data line is connected to the source electrode 16a, and is crossing a gate line (not shown) thus to define a pixel region.

A first passivation layer 17 formed of an organic material is formed on the source and drain electrodes 16a and 16b, thereby covering the TFT.

A reflector 18 formed of an opaque conductive material is formed at a pixel region on the first passivation layer 17. A second passivation layer 19 is formed on the reflector 18.

The second passivation layer 19 has a contact hole 19a through which the drain electrode 16b is exposed out.

A pixel electrode 20 formed of a transparent conductive material is formed at a pixel region on the second passivation layer 19.

The pixel electrode 20 is connected to the drain electrode 16b through the contact hole 19a, and serves as a transparent electrode. By the above process, a first alignment layer 21 is formed.

A black matrix 32 is formed on the second substrate 30, and color filters 33a and 33b formed of R, G and B are sequentially and repeatedly formed on the black matrix 32.

One of the color filters 33a and 33b corresponds to one pixel electrode 20, and the black matrix 32 covers the TFT and an edge of the pixel electrode 20.

An overcoat layer 34 for protecting and planarizing the color filters 33a and 33b is formed on the color filters 33a and 33b. The overcoat layer 34 is formed of an acrylic resin or a polyimide-based resin.

A common electrode 35 formed of a transparent conductive material is formed on the overcoat layer 34, and a second alignment layer 36 is formed on the common electrode 35.

A liquid crystal layer 40 is disposed between the first alignment layer 21 and the second alignment layer 36.

The liquid crystal is a twisted nematic LC, and an LC molecule 41 of the LC layer 40 is constantly arranged on the substrate with a pre-tilt angle.

However, the conventional semi-transmission LCD device is mainly used in a transmission mode since an amount of light introduced in the transmission mode is greater than an amount of light reflected in a reflection mode.

SUMMARY OF THE INVENTION

Therefore, an object of the present invention is to provide a semi-transmission liquid crystal display (LCD) device capable of enhancing a reflection efficiency of light by introducing external light to a reflection portion on an array substrate of a thin film transistor by concavely forming an overcoating layer on a color filter substrate, and capable of enhancing a transmission efficiency of light incident from a backlight, and a fabricating method thereof.

To achieve these and other advantages and in accordance with the purpose of the present invention, as embodied and broadly described herein, there is provided a semi-transmission LCD device, comprising: a first substrate; a second substrate; black matrixes formed on the second substrate with a predetermined gap therebetween; a color filter formed between the black matrixes; a common electrode formed on the color filter; an overcoat layer formed on the common electrode and having a concave shape; and an LC layer formed between the first substrate and the second substrate.

To achieve these and other advantages and in accordance with the purpose of the present invention, as embodied and broadly described herein, there is also provided a method for fabricating a semi-transmission LCD device, comprising: preparing a first substrate; preparing a second substrate; forming black matrixes on the second substrate with a predetermined gap therebetween; forming a color filter between the black matrixes; forming a common electrode on the color filter; forming an overcoat layer having a concave shape on the common electrode; and forming an LC layer between the first substrate and the second substrate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a semi-transmission LCD device and a fabricating method thereof will be explained in more detail.

Figure 1:
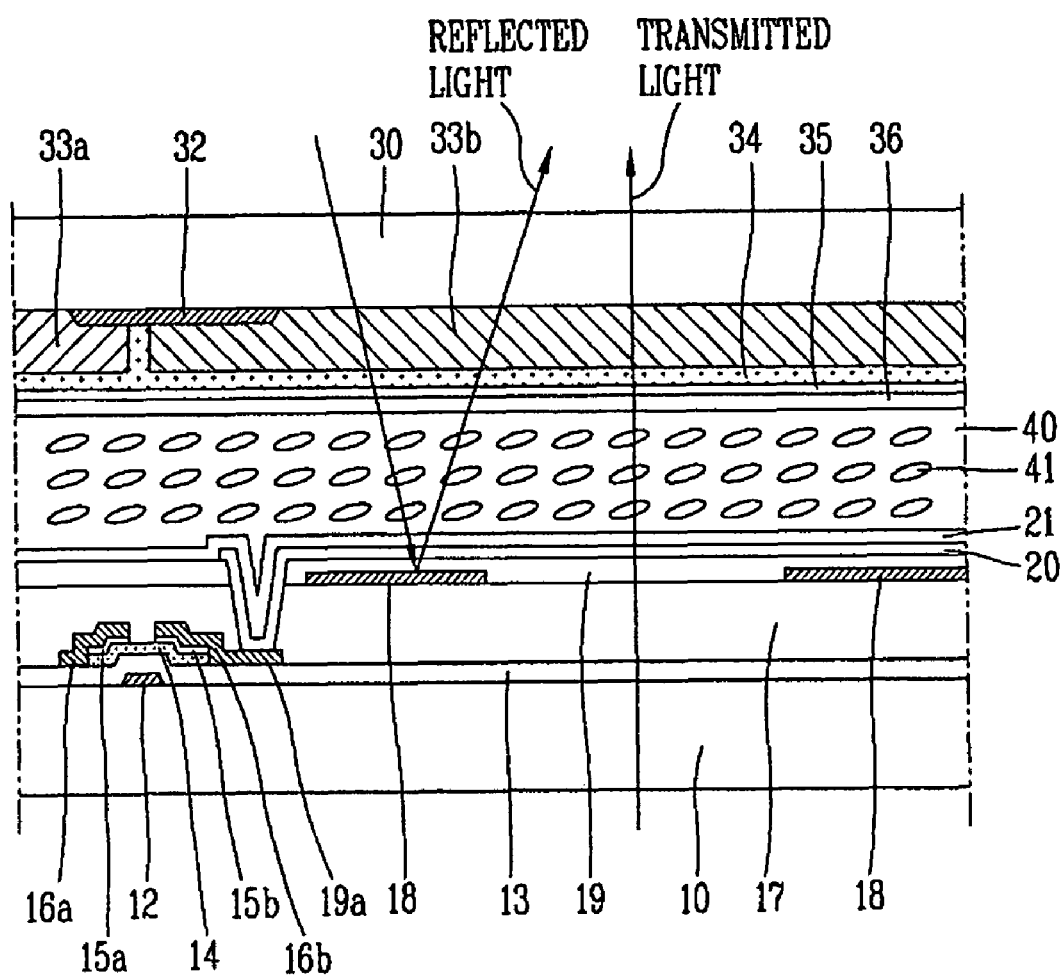
FIG. 1 is a configuration view partially showing a semi-transmission LCD device in accordance with the conventional art.
Figure 2:
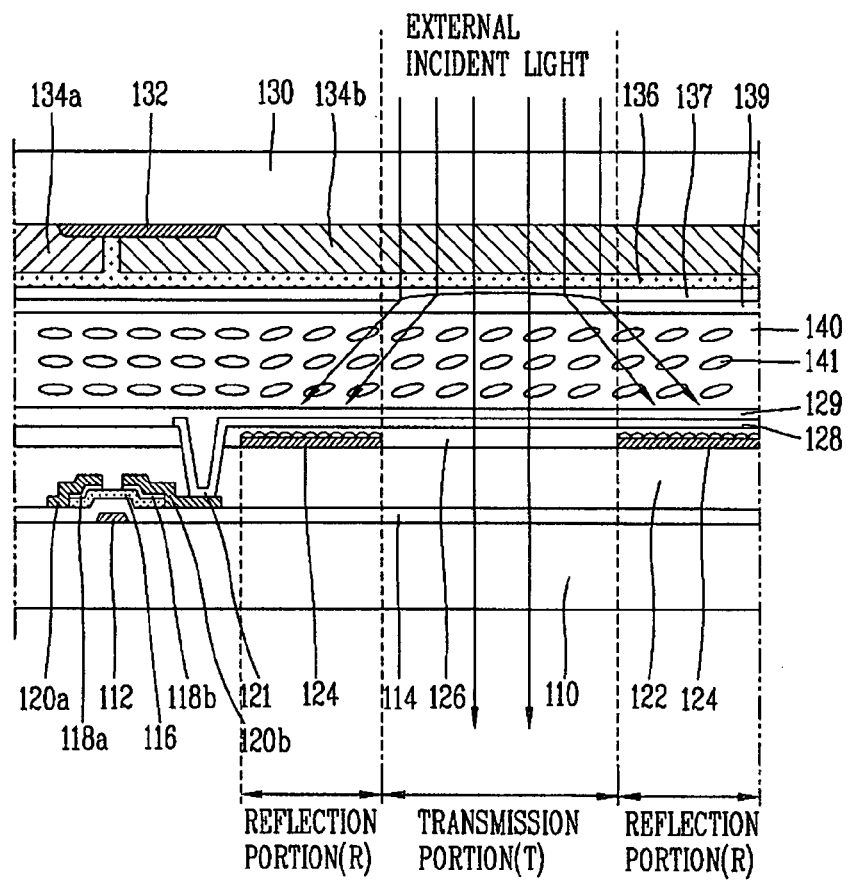
FIG. 2 is a configuration view partially showing a semi-transmission LCD device according to the present invention.

FIG. 2 is a configuration view partially showing a semi-transmission LCD device according to the present invention.

Referring to FIG. 2, the semi-transmission LCD device according to the present invention comprises a first substrate 110 and a second substrate 130 having a predetermined gap therebetween, and an LC layer 140 interposed between the two substrates.

A gate electrode 112 is formed on the lower first substrate 110 formed of a quartz or a glass, and a gate insulating layer 114 is formed thereon.

Then, an active layer 116 and ohmic contact layers 118a and 118b are sequentially formed on the gate insulating layer 114.

Then, source and drain electrodes 120a and 120b are formed on the ohmic contact layers 118a and 118b.

The source and drain electrodes 120a and 120b constitute a thin film transistor (TFT) together with the gate electrode 112.

A data line (not shown) formed of the same material as the source and drain electrodes 120a and 120b is further formed on the gate insulating layer 114.

The data line is connected to the source electrode 120a, and is crossing a gate line (not shown) thus to define a pixel region.

A first passivation layer 122 formed of an organic material is formed on the source and drain electrodes 120a and 120b, thereby covering the TFT.

A reflector 124 formed of an opaque conductive material and having a convex/concave shape is formed at a pixel region on the first passivation layer 122. A second passivation layer 126 is formed on the reflector 124.

The second passivation layer 126 has a contact hole 121 through which the drain electrode 120b is exposed out.

A pixel electrode 128 formed of a transparent conductive material is formed at a pixel region on the second passivation layer 126.

The pixel electrode 128 is connected to the drain electrode 120b through the contact hole 121, and serves as a transparent electrode.

A first alignment layer 129 is formed on the pixel electrode 128, thereby completing the lower TFT array substrate.

A black matrix 132 is formed on the second substrate 130 formed of a quartz or a glass.

The black matrix 132 also serves as a spacer.

Color filters 134a and 134b formed of R, G and B are sequentially and repeatedly formed on the black matrix 132. Then, a common electrode 136 formed of a transparent conductive material is formed on the color filters 134a and 134b.

One of the color filters 134a and 134b corresponds to one pixel electrode 128, and the black matrix 132 covers the TFT and an edge of the pixel electrode 128.

Then, by using a UV-hardened type acrylic resin, a first overcoat layer 137 having a concave shape 137a is formed on the second substrate 130 in correspondence with the pixel electrode 128 serving as a transparent electrode on the first substrate 110.

Then, on the first overcoat layer 137, formed is a second overcoat layer 139 having a different chemical reaction from the first overcoat layer 137, and formed of an arcyl-based resin having a different refraction ratio from the first overcoat layer 137.

Then, a second alignment layer (not shown) is formed on the second overcoat layer 139, thereby completing the upper color filter substrate.

The color filter substrate and the array substrate are attached to each other with a predetermined gap therebetween, and a liquid crystal is injected therebetween thus to form a liquid crystal layer 140.

The liquid crystal is a twisted nematic LC, and an LC molecule 141 of the LC layer 140 is constantly arranged on the substrate with a pretilt angle.

In the semi-transmission LCD device, light incident from a lower backlight is outputted through a transmissive hole between reflection electrodes, and external light is outputted by being reflected at the reflection electrode. Accordingly, a user can selectively use a reflection mode and a transmission mode.

In the reflection mode, a concave shape 137a is formed on the first overcoat layer 137 in correspondence to a transmission portion (T) on the first substrate 110. Accordingly, external light incident onto the concave shape 137a is induced to the reflector 124 of the first substrate 110, thereby enhancing a reflecting efficiency of light.

Details will be explained with reference to FIG. 3.

Figure 3:
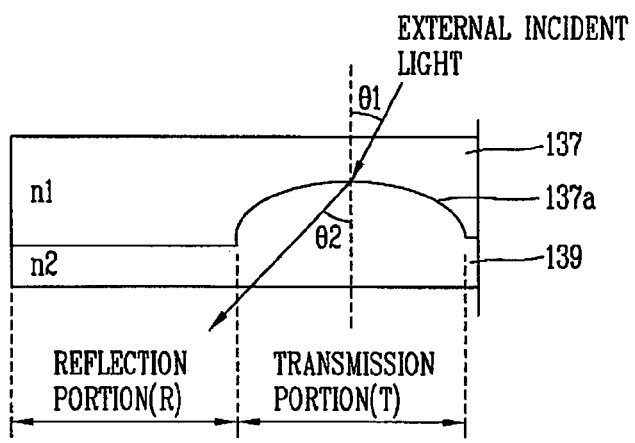
FIG. 3 is a view showing a state that external incident light is refracted by first and second overcoat layers of FIG. 2.

FIG. 3 is a view showing a state that external incident light is refracted by first and second overcoat layers of FIG. 2.

As shown, external incident light incident onto the transmission portion T on the first substrate 110 is refracted by the first the first overcoat layer 137 and the second overcoat layer 139 formed of the same-based material with different refraction ratios and having different chemical reactions from each other By the concave shape 137a formed on the first overcoat layer 137, a refraction ratio of light is more enhanced.

The first overcoat layer 137 has to be formed of the same-based material having a larger refraction ratio than the second overcoat layer 139.

Snell's law or refraction may be stated as:

$$n1 \times \sin(\theta1) = n2 \times \sin(\theta2)$$

Herein, the n1 denotes a refraction ratio of a material of the first overcoat layer, the θ1 denotes an incident angle of external light, n2 denotes a refraction ratio of a material of the second overcoat layer, and the θ2 denotes a refraction angle.

If the refraction ratio n1 of the material of the first overcoat layer 137 is larger than the refraction ratio n2 of the material of the second overcoat layer 139, the refraction angle (θ2) has to be larger than the incident angle (θ1).

Light flow in a transmission mode of the semi-transmission LCD device according to the present invention will be explained with reference to FIG. 4.

Figure 4:
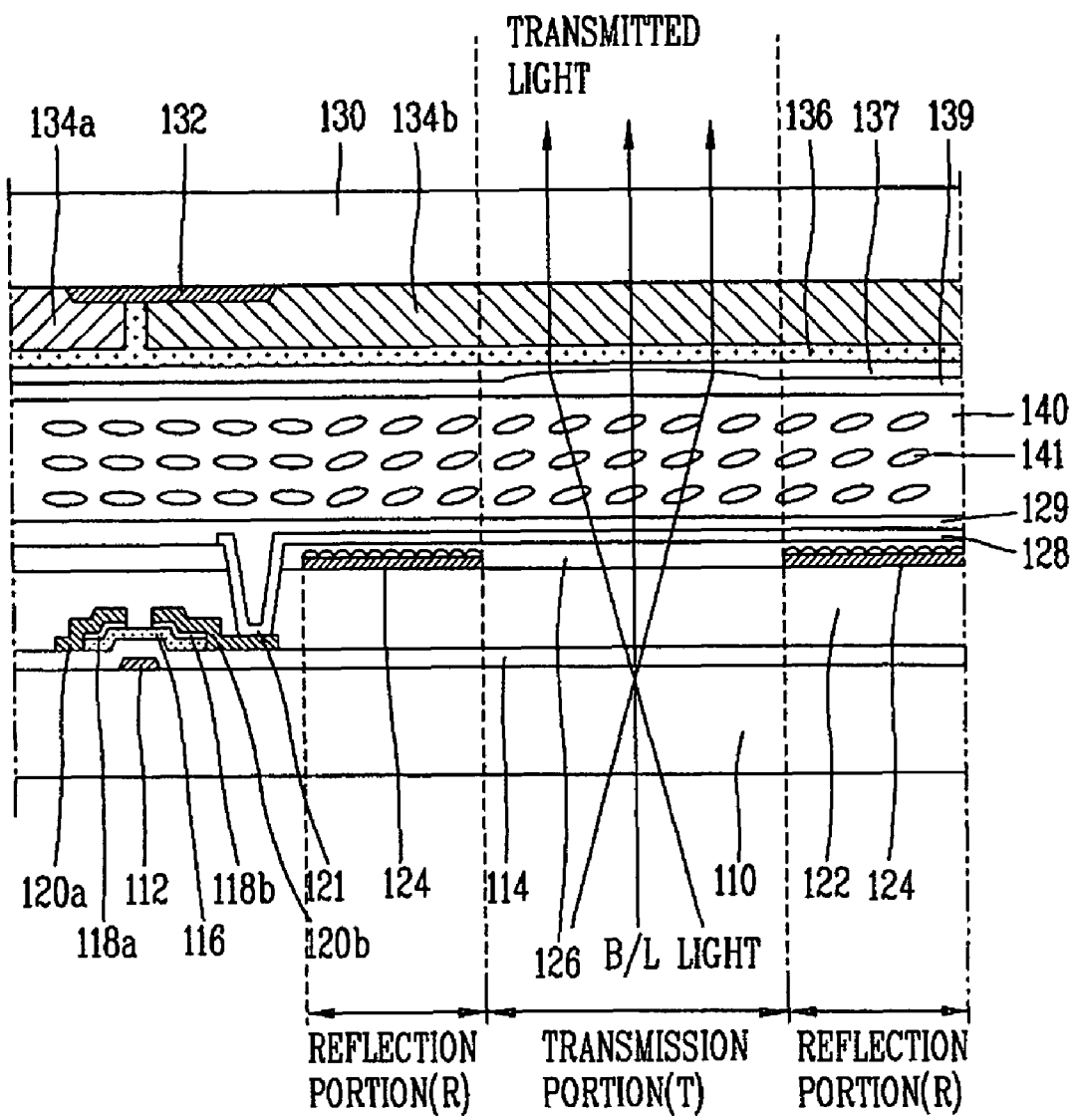
FIG. 4 is a configuration view partially showing a semi-transmission LCD device according to the present invention, which shows a state that external incident light is refracted by first and second overcoat layers of FIG. 2.

FIG. 4 is a configuration view partially showing a semi-transmission LCD device according to the present invention, which shows a state that external incident light is refracted by first and second overcoat layers of FIG. 2.

Referring to FIG. 4, in the transmission mode, the concave shape 137a is formed on the surface of the first overcoat layer 137 having a different refraction ratio from the second overcoat layer 139. Accordingly, light that passes in an inclined direction among incident backlight is refracted via the concave shape 137a of the first overcoat layer 137, thereby passing in a direction perpendicular to the first overcoat layer.

As backlight passes in a vertical direction via the concave shape 137a of the first overcoat layer 137, loss of light incident onto the reflection portion can be reduced.

A method for fabricating the semi-transmission LCD device according to the present invention will be explained with reference to FIGS. 5A to 5G.

FIGS. 5A to 5G are views showing a method for fabricating a color filter substrate of the semi-transmission LCD device according to the present invention.

Figure 5A:
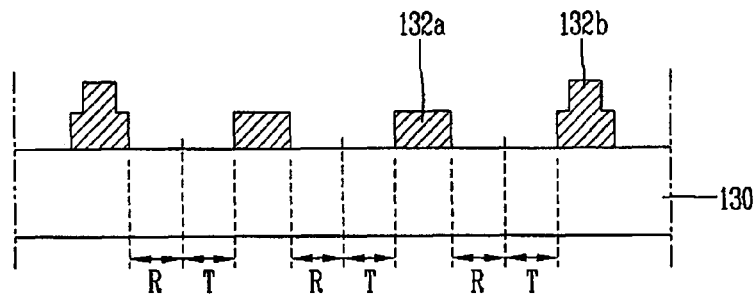
FIGS. 5A to 5G are views showing a method for fabricating a color filter substrate of FIG. 2.

Referring to FIG. 5A, a second substrate 130 such as a glass substrate is cleaned, and then Cr/CrOx used as a material of a black matrix is deposited on the second substrate 130 by a sputtering.

Then, the Cr/CrOx is selectively patterned by exposing and developing processes using a photolithography, thereby forming a plurality of black matrixes 132a and 132b having a predetermined space.

Preferably, the black matrix 132b of R, G and B that also serves as a spacer is disposed to be higher than the black matrix 132a.

Figure 5B:
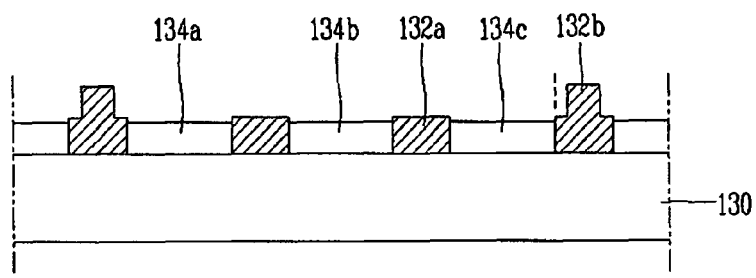

Referring to FIG. 5B, once the black matrixes 132a and 132b are formed, R, G, B color filters 134a, 134b and 134c are respectively deposited on the black matrixes 132a and 132b.

Then, the R, G, B color filters 134a, 134b and 134c are formed between the black matrixes 132a and 132b by repeating exposing and developing processes using a photolithography.

Figure 5C:
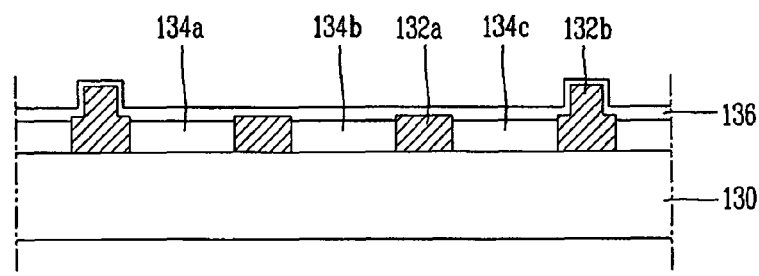

Referring to FIG. 5C, once the color filters 134a, 134b and 134c are formed, a common electrode 136 for operating an LC cell by an electric field together with a pixel electrode on the first substrate 110 is formed on the color filters 134a, 134b and 134c.

Herein, the common electrode 136 is formed of a transparent metallic material such as Indium Tin Oxide (ITO).

Figure 5D:
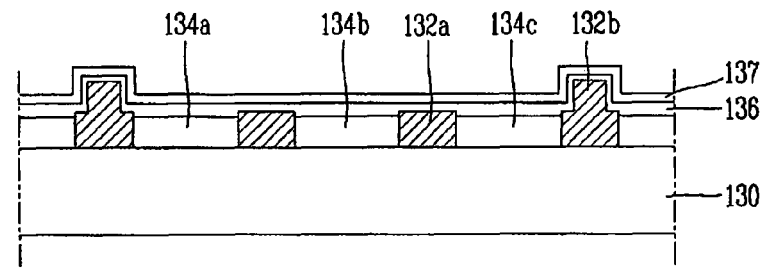

As shown in FIG. 5D, a UV-hardened type acrylic resin is deposited on the common electrode 136, thereby forming the first overcoat layer 137.

Figure 5E:
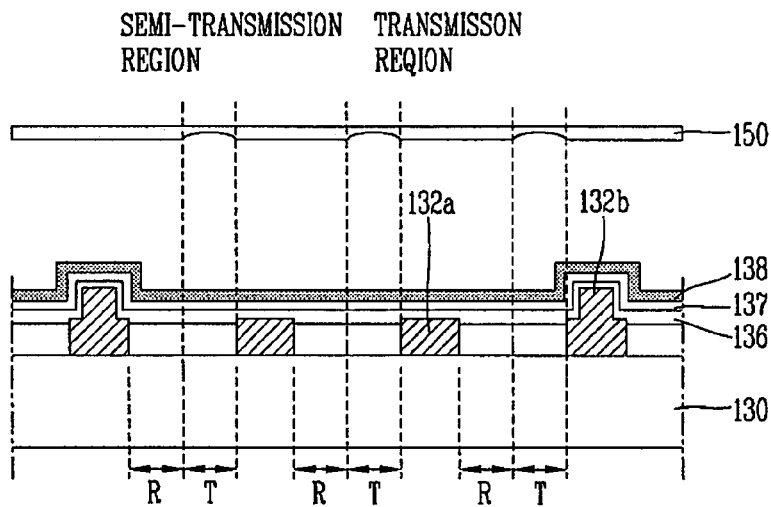

As shown in FIG. 5E, a photoresist 138 is deposited on the first overcoat layer 137.

Figure 5F:
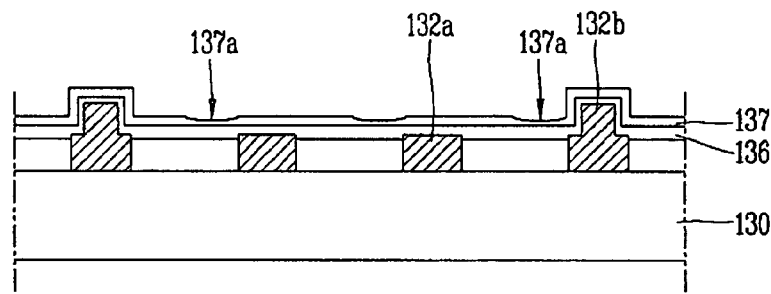

As shown in FIG. 5F, the photoresist 138 is selectively patterned through exposing and developing processes using a photolithography by using an additional mask 150 having a hole at a portion corresponding to the transmission portion T on the first substrate 110.

Then, the first overcoat layer 137 is selectively removed by using the patterned photoresist 138 as a shielding layer, thereby forming the first overcoat layer 137 having the concave shape 137a.

Figure 5G:
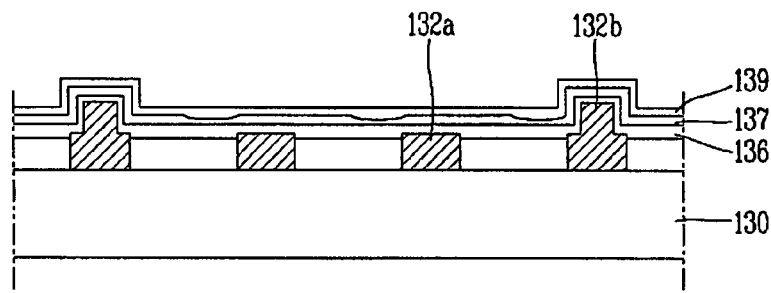

As shown in FIG. 5G, a second overcoat layer 139 formed of the same-based material having a different refraction ratio from the first overcoat layer 137 is formed on the first overcoat layer 137, thereby completing a color filter substrate.

In the present invention, light incident to the transmission portion on the first substrate in a reflection mode is introduced into the reflection portion on the first substrate, thereby enhancing a reflecting efficiency and a transmitting efficiency of light incident from the backlight.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A semi-transmission liquid crystal display (LCD) device, comprising:
a first substrate and a second substrate disposed to be spaced from each other, wherein the first substrate comprises: a gate electrode formed on the first substrate; a gate insulating layer formed on the gate electrode; a semiconductor layer formed on the gate electrode and the gate insulating layer; source and drain electrodes formed on the semiconductor layer; a first passivation layer formed on the source and drain electrodes; a reflector having a convex/concave shape and formed on the first passivation layer; a second passivation layer formed on the reflector; and a pixel electrode formed on the second passivation layer and being in contact with the drain electrode;
black matrixes formed on the second substrate with a predetermined gap therebetween;
a color filter formed between the black matrixes;
a common electrode formed on the color filter;
a first overcoat layer having a concave shape, formed on the common electrode, wherein the concave shape is formed first in correspondence to a transmission portion;
a second overcoat layer laminated on the first overcoat layer, wherein the second overcoat layer has a different refraction ratio from the first overcoat layer; and
a liquid crystal (LC) layer formed between the first substrate and the second substrate.

2. The semi-transmission LCD device of claim 1, wherein one black matrix of R, G and B that also serves as a spacer is disposed to be higher than another black matrix.

3. The semi-transmission LCD device of claim 1, wherein the concave shape is formed in correspondence to a transmission portion next to the reflector corresponding to at least one of the pixel electrodes on the first substrate.

4. The semi-transmission LCD device of claim 1, wherein the first overcoat layer is formed of a ultra violet-hardened type acrylic resin.

5. The semi-transmission LCD device of claim 1, wherein the second overcoat layer is formed of a same type of resin having a different refraction ratio from the first overcoat layer.

6. The semi-transmission LCD device of claim 1, wherein the first overcoat layer has a larger refraction ratio than the second overcoat layer.

7. A method for fabricating a semi-transmission LCD device, comprising:
preparing a first substrate and a second substrate spacing from each other, wherein the step of preparing a first substrate comprises: forming a gate electrode on the first substrate; forming a gate insulating layer on the gate electrode; forming a semiconductor layer on the gate electrode and the gate insulating layer; forming source and drain electrodes on the semiconductor layer; forming a first passivation layer on the source and drain electrodes; forming a reflector having a convex/concave shape on the first passivation layer; forming a second passivation layer on the reflector; and forming a pixel electrode on the second passivation layer and being in contact with the drain electrode;
forming black matrixes on the second substrate with a predetermined gap therebetween;
forming a color filter between the black matrixes;
forming a common electrode on the second substrate including the color filter and the black matrixes;
forming a first overcoat layer having a concave shape, on the common electrode, wherein the concave shape is formed first in correspondence to a transmission portion;
forming a second overcoat layer on the first overcoat layer, wherein the second overcoat layer has a different refraction ratio from the first overcoat layer; and
forming a liquid crystal (LC) layer between the first substrate and the second substrate.

8. The method of claim 7, wherein in the step of forming black matrixes, one black matrix of R, G and B that also serves as a spacer is disposed to be higher than another black matrix.

9. The method of claim 7, wherein the step of forming the first overcoat layer having the concave shape, on the second substrate comprises:
depositing a photoresist on the common electrode formed on the second substrate;
exposing the photoresist to light by using a mask; and
developing and etching the photoresist.

10. The method of claim 7, wherein the concave shape is formed first correspondence to a transmission portion next to the reflector corresponding to at least one of the pixel electrodes on the first substrate.

11. The method of claim 7, wherein the second overcoat layer is formed of a same type of resin and has a different refraction ratio from the first overcoat layer.

12. The method of claim 7, wherein the first overcoat layer has a larger refraction ratio than the second overcoat layer.

* * * * *